(12) United States Patent
Dahan et al.

(10) Patent No.: US 7,809,961 B2
(45) Date of Patent: Oct. 5, 2010

(54) STANDBY MODE FOR POWER MANAGEMENT

(75) Inventors: Franck Dahan, Nice (FR); Franck Seigneret, Roquefort les pins (FR); Gilles Dubost, Valbonne (FR)

(73) Assignee: Texas Instruments Incorporated, Dallas, TX (US)

( * ) Notice: Subject to any disclaimer, the term of this patent is extended or adjusted under 35 U.S.C. 154(b) by 836 days.

(21) Appl. No.: 11/559,388

(22) Filed: Nov. 13, 2006

(65) Prior Publication Data

US 2007/0113111 A1     May 17, 2007

(30) Foreign Application Priority Data

Nov. 14, 2005    (EP) ................................. 05292414

(51) Int. Cl.
| | |
|---|---|
| G06F 1/00 | (2006.01) |
| G06F 3/038 | (2006.01) |
| H04B 7/185 | (2006.01) |
| H04B 1/04 | (2006.01) |
| H04B 1/16 | (2006.01) |
| H04B 7/00 | (2006.01) |
| H04B 1/38 | (2006.01) |
| G09G 3/18 | (2006.01) |
| G11C 5/14 | (2006.01) |

(52) U.S. Cl. ........................ 713/300; 713/322; 713/324; 455/13.4; 455/127.5; 455/343.5; 455/522; 455/574; 345/52; 345/211; 365/227; 365/229

(58) Field of Classification Search ................. 713/300, 713/322, 323; 455/13.4, 127.1, 127.5, 345.5, 455/522, 574, 343.5; 345/52, 211; 365/227, 365/229

See application file for complete search history.

(56) References Cited

U.S. PATENT DOCUMENTS 5,493,684 A     2/1996    Gephardt et al.

(Continued)

FOREIGN PATENT DOCUMENTS

EP     0 574 177     12/1993

OTHER PUBLICATIONS

Mobile Computer Display Controller, Lynx3DM+Databook, May 21, 2002, pp. 1-349, Preliminary Version 0.8, Silicon Motion, Inc., U.S.A.

(Continued)

*Primary Examiner*—Stefan Stoynov
(74) *Attorney, Agent, or Firm*—Ronald O. Neerings; Wade James Brady, III; Frederick J. Telecky, Jr.

(57) ABSTRACT

An apparatus and method for controlling standby mode in an electronic device. In standby mode, power and clock signals are reduced or stopped to conserve power. The apparatus includes an initiator module coupled to a power and clock control module (PCCM). When the initiator module meets conditions for standby mode, the initiator module sends a standby signal to the PCCM and does not interact with other initiator, target, or interconnect modules. When the PCCM communicates a wait signal, the initiator module enters standby mode. When the initiator module detects a wakeup event, the standby signal is deactivated. In this state, the initiator module may process information but may not interact with other modules. When the PCCM deactivates the wait signal and returns power and clock signal to steady state levels, initiator module may resume normal operation.

23 Claims, 3 Drawing Sheets

U.S. PATENT DOCUMENTS

| | | | |
|---|---|---|---|
| 5,502,689 A | | 3/1996 | Peterson et al. |
| 5,630,145 A | * | 5/1997 | Chen .................. 713/322 |
| 5,642,489 A | | 6/1997 | Bland et al. |
| 5,661,751 A | | 8/1997 | Johnson |
| 5,664,203 A | * | 9/1997 | Hong et al. .............. 713/323 |
| 6,088,806 A | * | 7/2000 | Chee .................. 713/322 |
| RE38,108 E | | 5/2003 | Chee et al. |
| 6,665,802 B1 | | 12/2003 | Ober |
| 6,674,821 B1 | | 1/2004 | Mejyr |
| 6,711,691 B1 | | 3/2004 | Howard et al. |
| 2002/0032877 A1 | | 3/2002 | Iwaki |
| 2002/0184438 A1 | * | 12/2002 | Usui ..................... 711/106 |
| 2004/0230850 A1 | | 11/2004 | Baumgartner et al. |

OTHER PUBLICATIONS

Chris Wellheuser, Metastability performance of Clocked FIFOs, 1996, pp. 1-12, Texas Instruments, U.S.A.

* cited by examiner

STANDBY MODE FOR POWER MANAGEMENT

CROSS REFERENCE TO RELATED APPLICATIONS

This application claims priority to EPO Application No. 05292414.9, filed Nov. 14, 2005, incorporated herein by reference.

FIELD OF THE INVENTION

The present invention generally relates to power management in an electronic device. More particularly, the invention relates to a system to manage power in an electronic device by the use of various signals. Still more particularly, the invention relates to power management during operation of the electronic device through the control of power and clock signals.

BACKGROUND OF THE INVENTION

A goal of electronics manufacturers has been to reduce power consumption in electronic devices. Reducing consumption of power lowers the heat generated by the device, thereby increasing the reliability and decreasing the operating cost of the device. In addition, reducing the consumption of power allows battery-powered portable electronic devices, such as cellular telephones, portable music players, laptop computers, and portable gaming devices, to operate for longer periods without recharging or charging the batteries.

Various techniques have been devised for reducing power consumption of electronic devices. These techniques include decreasing the amount of circuitry on a chip so as to reduce the power consumption of the chip. Power management units may also be used to reduce the power consumption. One power reduction technique includes the capability of stopping clock signals that drive circuits which are inactive in the chip for a period of time. A device employing such a technique includes a power management unit (PMU) that detects or predicts inactive circuits and accordingly stops clock signals associated with the inactive circuits. By turning off clock signals that drive inactive circuits, power consumption of the electronic device decreases. Additionally, removing power from inactive circuits may reduce leakage currents within the circuits. Other techniques include reducing the frequency of clock signals that drive circuits during modes of operation that are not time critical and removing power from inactive circuits.

Systems to manage power that use the above mentioned power reduction techniques monitor activities within the electronic device. For example, the PMU may couple directly through control lines to a microprocessor and peripheral devices. The control lines permit the PMU to determine the activities that occur in the microprocessor and peripheral devices. Depending on what activities the PMU detects, the PMU may responsively power down circuits, reduce the clock signal frequencies, or stop selected clock signals.

As described above, power management may reduce power consumption in an electronic device, decrease heat generation, increase reliability, and decrease cost. However, current power management techniques are difficult to design and verify that the techniques are operating properly and may lead to unpredictable and unstable operation of the electronic device. Thus, a power management system and method that is simple to design and verify and ensures reliable and predictable operation of the electronic device would be preferred.

SUMMARY OF THE INVENTION

The problems noted above are solved by a system and method for initiation of a standby mode in an electronic device. A power and clock control module (PCCM) couples to an initiator module. An initiator module may be a processor, graphics accelerator, display controller, audio interface, digital signal processor, microcontroller unit (MCU), direct memory access (DMA) device, video accelerator, or a universal serial bus (USB) device. The initiator module may enter standby mode when conditions are met. When these conditions are met, the initiator module transmits a standby signal to the PCCM through a standby line. For example, the initiator module, which is capable of communicating with other components in the electronic device, may activate the standby signal when the initiator module no longer needs to communicate with these components.

After the initiator module activates the standby signal through the standby line, the PCCM may activate a wait signal to the initiator module. The PCCM transmits the wait signal to the initiator module through a wait line. After receiving the wait signal, the initiator module may enter standby mode. In standby mode, the functionality of the initiator module may be limited. Thus, for example, interaction between the initiator module in standby mode and other device components may be limited or prohibited. For instance, the initiator module may not communicate with an interconnect module during standby mode. An interconnect module may be a device capable of transferring information requested by read and write commands and coordinating interactions between the initiator module and components of the electronic device. Further, power and at least one clock signal transmitted to the interconnect module may be limited when the initiator module enters standby mode.

In some embodiments of the invention, the PCCM may transmit power and at least one clock signal to the interconnect module and a target module. The target module may be any device that is the final destination of a read or write request. The interconnect module couples between the initiator module and the target module. Read and write instructions initiated in the initiator module may be transferred by the interconnect module to the target module, which may carry out the instructions. Power and at least one clock signal to the target module and the interconnect module may be removed when the initiator module enters standby mode.

Transmission of power and clock signals to the initiator module may also be limited in standby mode. The PCCM, which may control power and at least one clock signal to the initiator module through a power line and at least one clock line, may partially or totally remove power transmitted to the initiator module during standby mode. The PCCM may also limit or remove the at least one clock signal transmitted to the initiator module. Further, the PCCM may reduce the frequency of the clock signal. In some embodiments of the invention, the standby and wait signals may be activated and deactivated synchronously to the clock signal transmitted to the initiator module. In some other embodiments of the invention, the standby signal is capable of deactivating asynchronously to the at least one clock signal transmitted to the initiator module and the wait signal is capable of activating asynchronously to the at least one clock signal transmitted to the initiator module.

The initiator module may deactivate the standby signal when a predefined standby mode wakeup condition is detected. Once the standby signal deactivates, the PCCM may deactivate the wait signal when power and the at least one clock signal to the initiator module, the interconnect module, and the target module are returned to normal operating levels, thus allowing the initiator module to exit standby mode. The initiator module may resume normal functionality once standby mode has been exited. In some embodiments of the invention, the initiator module may be delayed from exiting standby mode by at least one clock cycle. This delay prevents the initiator module from improperly processing information to generate erroneous output.

In some embodiments of the invention, the initiator module may enter a forced standby mode if processing in the initiator module is not enabled and the standby signal is activated. In some other embodiments of the invention, the initiator module is capable of entering a no standby mode in which the standby signal is not activated.

The initiator module may comprise a processing logic unit capable of processing information. The processing logic module may couple to a system interface unit (SIU). The SIU is capable of interfacing with other components of the electronic device, such as a target module. A standby interface unit may couple to the SIU and the processing logic unit. The SIU may determine if the initiator module may enter and exit standby mode, forced standby, or no standby mode. The initiator module may contain a register which the SIU may use to determine if the initiator module should enter or exit standby mode, forced standby, or no standby mode by reading the contents of the register. In some embodiments of the invention, an external interface unit may couple to the processing logic unit. The external interface unit may interface with an external device.

NOTATION AND NOMENCLATURE

Certain terms are used throughout the following description and claims to refer to particular device components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . ." Also, the term "couple" or "couples" is intended to mean either an indirect or direct electrical connection. Thus, if a first device couples to a second device, that connection may be through a direct electrical connection or though an indirect electrical connection via other devices and connections. Furthermore, the term "information" is intended to refer to any data, instructions, or control sequences that may be communicated between components of a device. For example, if information is sent between two components, data, instructions, control sequences, or any combination thereof may be sent between the two components.

DETAILED DESCRIPTION OF THE EMBODIMENTS

In accordance with some embodiments of the invention, in an electronic device, a power and clock control module (PCCM) is coupled to an initiator module, interconnect module, and target module. An initiator module is any logic circuitry that may generate write requests or read requests. Thus, the initiator module may be a processor, direct memory access controller, digital signal processor, video accelerator, a peripheral device that is capable of initiating read or write requests, and so on. An interconnect module may be any logic circuitry capable of routing information from an initiator module to a target module. Examples of interconnect modules are a bus, an interconnection network, and so on. A target module is any logic circuitry that is the destination of a write request or a read request. Examples of target modules include memory devices such as a cache, register, static random access memory (SRAM) controller, dynamic random access memory (DRAM) controller located in a processor or external to the processor, and so on. Another example of a target module is a peripheral device such as a display device.

Initiator modules initiate read and write requests to target modules. When an initiator module meets some internal conditions and no longer initiates read and write requests to target modules, the initiator module may enter standby mode to reduce the consumption of power by the initiator module and the surrounding system. The PCCM controls standby mode in the initiator module by using standby and wait signals.

Figure 1:
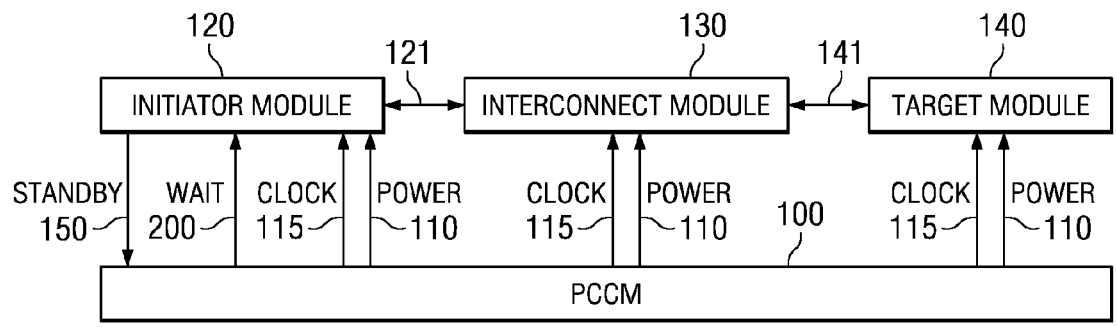
FIG. 1, in accordance with some embodiments of the invention, shows a power and clock control module (PCCM) coupled to an initiator module, interconnect module, and target module through power, clock, standby, or wait lines.

Referring to FIG. 1, a power and clock control module (PCCM) 100 couples to an initiator module 120, interconnect module 130, and target module 140. PCCM 100 provides power and a clock signal to each module through power line 110 and clock line 115. Power line 110 provides power to logic circuits in each module, and clock line 115 provides a clock signal to logic circuits in each module for control and synchronization.

In the electronic device shown in FIG. 1, interconnect module 130 couples to both initiator module 120 and target module 140 and may be any logic circuitry capable of routing information, such as data and instructions, from initiator module 120 to target module 140. Further, interconnect module 130 may communicate events, such as interrupts or DMA requests, between target module 140 and initiator module 120. An interrupt is a signal that momentarily interrupts initiator module 120 processing and indicates to initiator module 120 that a predefined event has occurred within target module 140. In some embodiments of the invention, events may be communicated between target module 140 and initiator module 120 through separate connections between the modules (not shown).

Interconnect module 130 may consist of a bus, which may be described as a set of conductors coupled between modules of the electronic device. In some embodiments of the invention, interconnect module 130 may be an interconnection network which is a collection of buses connected together to form a mesh with nodes at the bus intersections, the buses including logic circuitry that can route information from one module at a node to another module at another node. Further, interconnect module 130 may be any other device capable of routing information between modules.

Initiator module 120 is any logic circuitry within an electronic device that generates write or read requests. Initiator module 120 may be a processor, direct memory access (DMA) controller, digital signal processor (DSP), video accelerator, peripheral device, any other type of device capable of executing write or read instructions, and so on. Initiator module 120 connects to interconnect module 130 through connection 121.

Target module 140 is any logic circuitry within a device that is the destination of a write or read request in the device. Target module 140 may be a memory device, such as a register, cache, internal or external SRAM or DRAM controller, a peripheral device, such as a display device, and so on. Interconnect module 130 connects to target module 140 through connection 141.

Initiator module 120, for example, may be a processor capable of reading information from target module 140, which may be a memory controller. When initiator module 120 generates a request to target module 140, interconnect module 130 coordinates the request to the memory controller. Interconnect module 130 then coordinates the transmission of data obtained from the memory controller to the processor. In some embodiments of the invention, multiple initiator modules 120 and target modules 140 may be present and interconnect module 130 may serve to coordinate the flow of information between the modules.

Modules in an electronic device may include circuitry which are not contiguously placed next to each other but rather distributed throughout the device. Thus, the modules shown in FIG. 1 may be considered a logical partitioning of the circuits on an electronic device rather than a physical partitioning. For example, consider a chip containing the circuitry for a processor and a cache. The processor circuitry may be located on different parts of the chip and contiguous to or mixed in with the cache circuitry. Circuitry for the processor may be logically grouped into an initiator module and the circuitry for the cache may be logically grouped into a target module. Similarly, the chip may contain bus circuitry that is distributed along different parts of the chip and which connects the processor circuitry and cache circuitry. The bus circuitry may be logically grouped into an interconnect module.

When initiator module 120 does not initiate read or write requests to target module 140, PCCM 100 may deactivate or limit the power and the clock signal transmitted to initiator module 120, interconnect module 130, and target module 140 to reduce the power consumed by the logic circuitry in the modules. Thus, initiator module 120 may enter a standby mode in which it consumes less power and may not use the clock signal. Initiator module 120 does not initiate read or write requests to target module 140 while in standby mode. Initiator module 120 may exit standby mode if a read or write request needs to be initiated to other components of the device. For example, while in standby mode, initiator module 120 may receive an event, such as an interrupt or DMA request, from target module 140 or an external device (not shown) indicating that the initiator module 120 needs to exit standby mode and initiate a request to target module 140. To exit standby mode, initiator module 120 informs PCCM 100 to activate the power and the clock signal.

Initiator module 120 entering standby mode may cause interconnect module 130 to also enter a power saving mode if interconnect module 130 does not have information to transmit. This technique of placing initiator module 120 in standby mode and interconnect module 130 in power saving mode may reduce power consumption within the device. While the amount of power saved each time an initiator module 120 enters standby mode may not be significant, the cumulative effect of power saved over time as initiator module 120 enters standby mode may be considerable. Because multiple initiator modules 120, interconnect modules 130, and target modules 140 may be present in the device, standby mode in the initiator module and power saving mode in the interconnect and target modules may save significant amounts of power. Thus, electronic devices utilizing standby mode and power saving mode allow battery powered devices such as laptop computers, portable music players, cellular telephones, personal digital assistants (PDA), and other portable electronic devices to reduce power consumption and increase battery life. In some embodiments of the invention, power and clock signals to the initiator module 120 may be partially removed or not removed at all when standby mode is entered. This may allow initiator module 120 to function in standby mode. Thus, initiator module 120 may operate in standby mode without communicating through interconnect module 130. This may allow interconnect module 130 and target module 140 to enter power saving modes while initiator module 120 operates in standby mode.

In some embodiments of the invention, as described above, initiator module 120 may detect when it may be able to enter standby mode. Initiator module 120 communicates to PCCM 100 that initiator module 120 is ready to enter standby mode under certain conditions described below. For instance, initiator module 120 may detect that no read or write requests have been initiated over a certain number of clock cycles. Initiator module 120 may then communicate to PCCM 100 by activating a standby signal through a standby line 150 as shown in FIG. 1 or by transmitting a standby command through a bus connection between initiator module 120 and PCCM 100 (not shown). When PCCM 100 receives the standby signal, PCCM 100 may reduce or eliminate power sent to initiator module 120 and turn off the clock signal transmitted to initiator module 120. Alternatively, PCCM 100 may reduce the frequency of the clock signal. Thus, initiator module 120 may utilize the clock signal while reducing power consumption. If a condition which may cause initiator module 120 to wakeup from standby mode occurs as described below, initiator module 120 may deactivate the standby signal to PCCM 100. One condition which may cause initiator module 120 to exit standby mode is initiator module 120 receiving an interrupt signal from target module 140 while initiator module 120 is in standby mode. Initiator module 120 then exits standby mode by deactivating the standby signal to PCCM 100, and PCCM 100 transmits normal power and the clock signal to initiator module 120.

In some embodiments of the invention, initiator module 120 may not indicate to PCCM 100 that initiator module 120 would like to enter standby mode. PCCM 100 may determine that initiator module 120 should be in standby mode by monitoring the interaction of initiator module 120 with target module 140. For example, if PCCM 100 detects that initiator module 120 has not initiated a read or write request over a period of time, PCCM 100 may reduce power and clock signal transmitted to the initiator module. PCCM 100 may detect interaction between initiator and target modules for a device with many of these modules and place the initiator modules that are inactive in standby mode.

If the conditions to enter standby mode as described above occur, PCCM 100 may limit or remove power and the clock signal to initiator module 120. If before PCCM 100 cuts off power and clock signal to initiator module 120, initiator module 120 receives an interrupt or other wakeup event, an edge condition error may occur. For example, PCCM 100 shuts down power and the clock signal to the initiator module when the initiator module enters standby mode. If an interrupt occurs, the initiator module performs a read or write instruction, or other wakeup event occurs in the initiator module 120 just as PCCM 100 removes power and the clock signal, the initiator module 120 may not execute the write instruction or service the interrupt and an error may occur.

A wait signal may be communicated from PCCM 100 to initiator module 120 to prevent edge condition errors as described above from occurring. As shown in FIG. 1, a wait signal line 200 couples PCCM 100 to initiator module 120. Thus, the device shown in FIG. 1 is capable of entering a standby mode that may reduce power consumption and avoid edge condition errors. In the embodiments of the invention using a wait signal, initiator module 120 determines if the initiator module should enter standby mode and activates the standby signal to PCCM 100. Once initiator module 120 activates the standby signal, initiator module 120 may no longer initiate requests to target module 140. Initiator module 120 enters standby mode after PCCM 100 activates the wait signal to initiator module 120.

When an event wakes up initiator module 120 from standby mode, initiator module 120 deactivates the standby signal. However, PCCM 100 does not deactivate the wait signal until the power and clock signals to initiator module 120 from PCCM 100 reach steady state operating conditions and interconnect module 130 and target module 140 also reach steady state operating conditions. Only after the clock and power signals have reached steady state and PCCM 100 has deactivated the wait signal does initiator module 120 exit standby mode and resume normal operation. In some embodiments of the invention, initiator module 120 may not execute instructions or initiate requests to target module 140 until PCCM 100 deactivates the wait signal. In some other embodiments of the invention, initiator module 120 may be designed to operate in a low power or low clock frequency environment during standby mode to execute instructions or perform other "background" processing.

In some embodiments including standby and wait signals, edge condition errors may be avoided by initiator module 120 waiting for a time after deactivating the standby signal before executing instructions or initiating requests. Initiator module 120 waiting for a time ensures that the wait signal does not activate and power and the clock signal are not removed. Thus, edge condition errors described above may be avoided. For example, initiator module 120 may activate the standby signal then detect a wakeup condition. PCCM 100 may activate the wait signal and turn off power and the clock signal to initiator module 120 just as initiator module 120 deactivates the standby signal. By avoiding communication between initiator module 120 and target module 140 for a time after deactivation of the standby signal, communication will not be disrupted because initiator module 120 will not communicate with target module 140 until after PCCM 100 deactivates the wait signal and brings clock and power signal to a steady state.

In accordance with some embodiments of the invention as described above, power consumption may be reduced while allowing error free operation of the electronic device. Verification and validation of the electronic device shown in FIG. 1 may be performed by individually testing each module to ensure the standby and wait signals function properly. Partitioning of the logic circuitry into modules allows simplified verification and testing. Thus, costly and time consuming testing of the device at the system level for the standby power management system may not be necessary.

Figure 2:
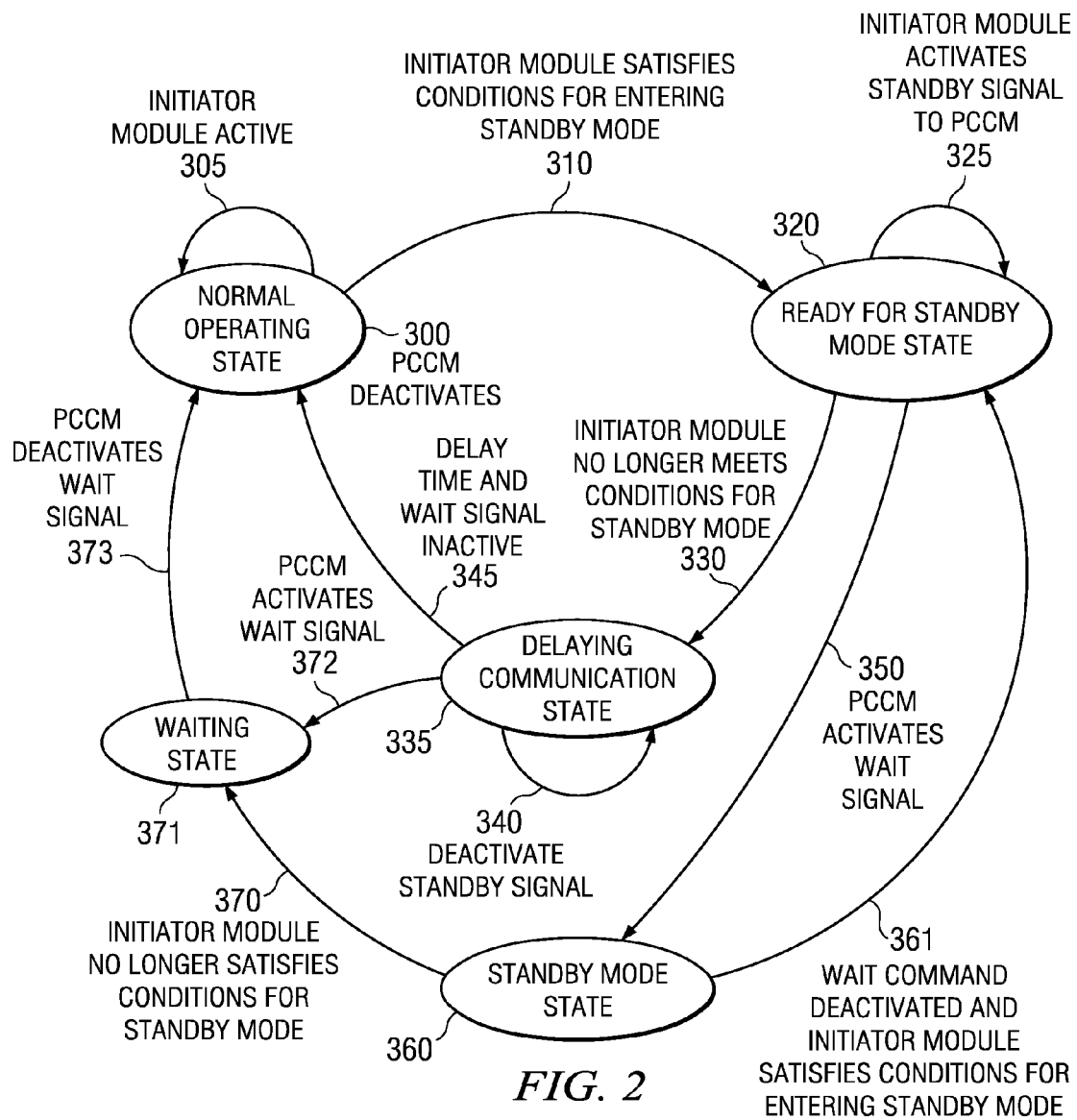
FIG. 2 shows a state diagram with the states for standby mode in accordance with some embodiments of the invention.

Turning now to FIG. 2, a state diagram for standby mode includes the following states: normal operating state 300, ready for standby mode state 320, delaying communication state 335, standby mode state 360, and waiting state 371. In normal operating state 300, initiator module 120 is active 305 and may initiate write and/or read requests to target module 140, process information, and/or perform predefined tasks specific to the initiator module. When initiator module 120 satisfies conditions for entry into standby mode 310, initiator module 120 may enter ready for standby mode state 320. Entry into standby mode may occur when initiator module 120, for a period of time, has not initiated write or read requests, processed information, or performed other tasks.

In ready for standby mode state 320, initiator module 120 activates the standby signal to PCCM 325. Once the standby signal has been activated, initiator module 120 may no longer communicate with target module 140. If initiator module 120 no longer meets the conditions for standby mode 330, initiator module 120 may enter a delaying communication state 335 and deactivate the standby signal 340. In ready for standby mode state 320, for instance, initiator module 120 may receive an interrupt from target module 140, thus indicating that the initiator module should wake up and exit standby mode. Initiator module 120 transitions to delaying communication state 335 and deactivates the standby signal 340. Furthermore, in delaying communication state 335, initiator module 120 may perform processing related to the exit from ready for standby mode 320. However, initiator module 120 may not communicate with other modules in the device other than PCCM 100 for an amount of time that may vary in accordance with some embodiments of initiator module 120. Delaying communication state 335 avoids the edge condition errors described above. Once the delay time 345 passes and no wait signal is received, initiator module 120 may enter normal operating state 300. If PCCM 100 activates the wait signal 372 after the standby signal has been deactivated 340, the initiator module may enter waiting state 371. Initiator module 120 may then transition to normal operating state 300 after PCCM 100 deactivates the wait signal 373.

In ready for standby mode state 320, initiator module 120 activates the standby signal to PCCM 325. If PCCM 100 activates the wait signal 350, the initiator module may enter standby mode state 360. PCCM 100 may reduce or eliminate the power signal and the clock signal to initiator module 120, and the initiator module may remain in standby mode state 360 until a wakeup event, as described above, occurs. In some embodiments of the invention, PCCM 100 may deactivate the wait signal. If initiator module 120 still satisfies 361 conditions for entry into standby mode, initiator module 120 enters ready for standby mode state 320.

If initiator module 120 no longer satisfies 370 conditions for standby mode, initiator module 120 may exit standby mode state 360 and enter waiting state 371. The initiator module 120 may enter normal operating state after PCCM 100 deactivates wait signal 373. For example, initiator module 120 may deactivate the standby signal when a wakeup event occurs. However, the wait signal may not be deactivated until power and clock signal stabilize to a steady state level for normal initiator module 120 operation and the interconnect module 130 and target module 140 also stabilize to steady state levels. Only after the wait signal has been deactivated 373 may initiator module 120 enter normal operating state 300. In some embodiments of the invention, initiator module 120 may not start processing until PCCM 100 deactivates the wait signal. In some other embodiments, initiator module 120 may start processing of the wakeup event before the PCCM 100 deactivates the wait signal. Initiator module 120 may not communicate with target module 140 until the wait signal is deactivated and the initiator module enters normal operating state 300.

Figure 3:
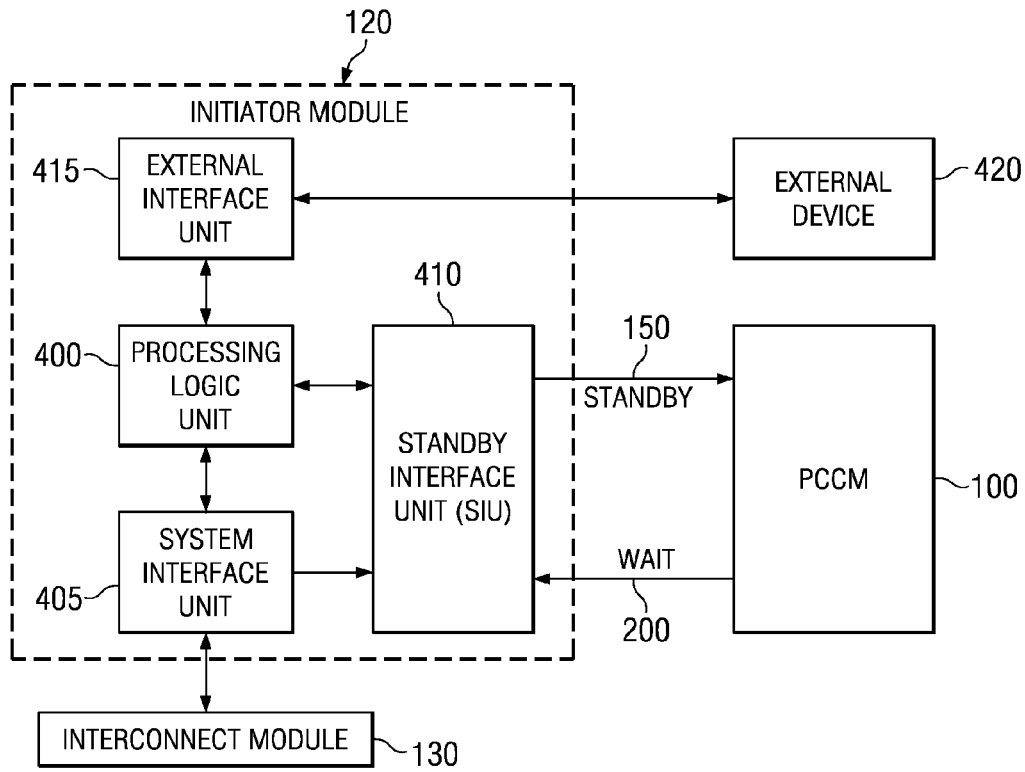
FIG. 3, in accordance with some embodiments of the invention, shows a system including an initiator module, interconnect module, and a PCCM.

Turning now to FIG. 3, initiator module 120 includes a processing logic unit 400 coupled to a system interface unit 405, a standby interface unit 410 (SIU), and an external interface unit 415. System interface unit 405 may generate requests and interrupts that are transmitted to initiator, interconnect, or target modules. Processing logic unit 400 may be a processor and circuitry such as a bus, external cache, and so on. Thus, for example, if initiator module 120 is a video accelerator, processing logic unit 400 may consist of a video processor, memory device, bus, and other components commonly found within a video accelerator.

SIU 410 couples to PCCM 100 through standby line 150 and wait line 200. In some embodiments of the invention, SIU 410 determines if initiator module 120 should be placed into standby mode by evaluating the activity in initiator module 120 and wait line 200. If SIU 410 determines that the initiator module should be placed into standby mode, SIU 410 may activate the standby signal to PCCM 100. Correspondingly, SIU 410 may detect activation of the wait signal and enable initiator module 120 to enter standby mode. In some embodiments of the invention, SIU 410 also coordinates wakeup from standby mode if wakeup conditions, as described above, occur.

In some embodiments of the invention, external interface unit 415 couples to an external device 420. External interface unit 415 connects to processing logic unit 400. In some embodiments of the invention, initiator module 120 may be a peripheral device such as a universal serial bus (USB) interface capable of interfacing between an external device and other components in a system. For example, the USB interface may be capable of interfacing with an external device 420 that may be a digital camera. In some embodiments of the invention, processing logic unit 400 may be capable of transferring data from the digital camera through system interface unit 405 for use by target modules (not shown in FIG. 3). When the digital camera and the USB interface are inactive, the USB interface may enter standby mode. If a user attempts to transfer information from the digital camera through the USB interface, the USB interface detects that a wakeup condition has occurred and deactivates the standby signal to exit from standby mode.

In some embodiments of the invention, initiator module 120 may be designed differently for different processing devices. Thus, initiator module 120 may include the units shown in FIG. 3 and additional or different units for a DSP compared to a video accelerator.

Figure 4:
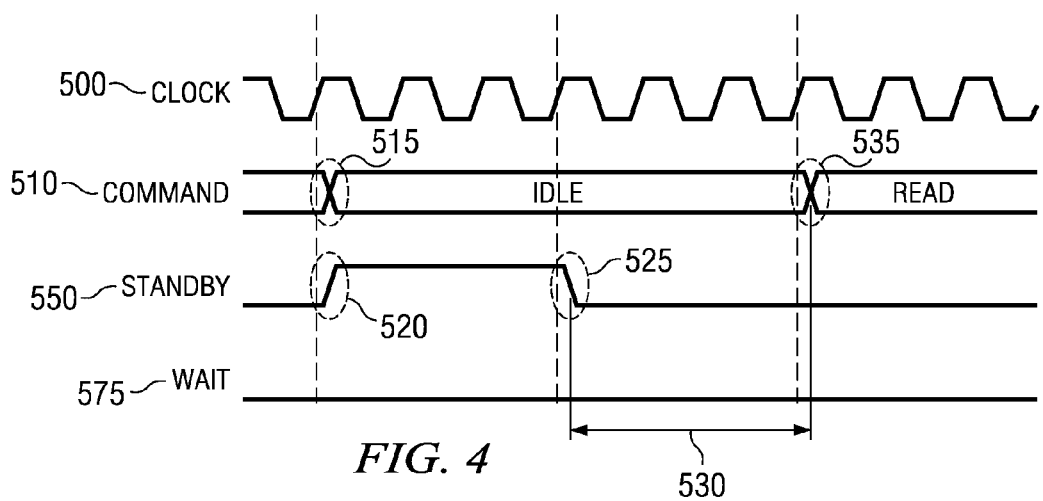
FIG. 4 shows a timing diagram of some signals associated with the initiator module for activating and deactivating the standby signal.

Referring to FIG. 4, a timing diagram for initiator module 120 comprises clock signal 500 to initiator module 120, command signal 510, standby signal 550, and wait signal 575. As described above, clock signal 500 synchronizes timing for initiator module 120 units. Clock signal 500 is transmitted from PCCM 100 to initiator module 120 through clock line 115 as shown in FIG. 1. Command signal 510 shows timing for requests sent from the initiator module to the target module in FIG. 1. Thus, command signal 510 may transmit write and read requests.

Initiator module 120 transmits a standby signal to PCCM 100. In some embodiments of the invention, the standby signal is activated when standby signal 550 transitions from low to high 520. The standby signal is deactivated when standby signal 550 transitions from high to low 525.

PCCM 100 transmits a wait signal to initiator module 120. The wait signal is activated when wait signal 575 transitions from low to high. In some embodiments of the invention, the wait signal is deactivated when wait signal 575 transitions from high to low.

In some other embodiments of the invention, activation and deactivation of signals, such as the standby signal and the wait signal, may be represented by a logical low or a logical high. In some other embodiments, activation and deactivation may be represented by a combination of several signals, one signal from a group of multiplexed signals, an encoded signal, or a sequence of burst signals.

When command signal 510 is idle 515 for a time period and all other requirements for entry into standby mode are present, initiator module 120 may activate 520 standby signal 150 to PCCM 100. Before PCCM 100 activates wait signal 200, standby signal 150 deactivates 525, as shown in FIG. 4, because a wakeup condition from standby mode occurs. For example, initiator module 120 may receive an interrupt from target module 140. An amount of time may pass 530 once the standby signal has been deactivated, three clock cycles in this example, and the initiator module may now communicate 535 with target module. The three clock cycle delay avoids the edge condition error described above. When normal operating state is entered, initiator module 120 initiates a read request 535 to target module 140 through command signal 510.

Figure 5:
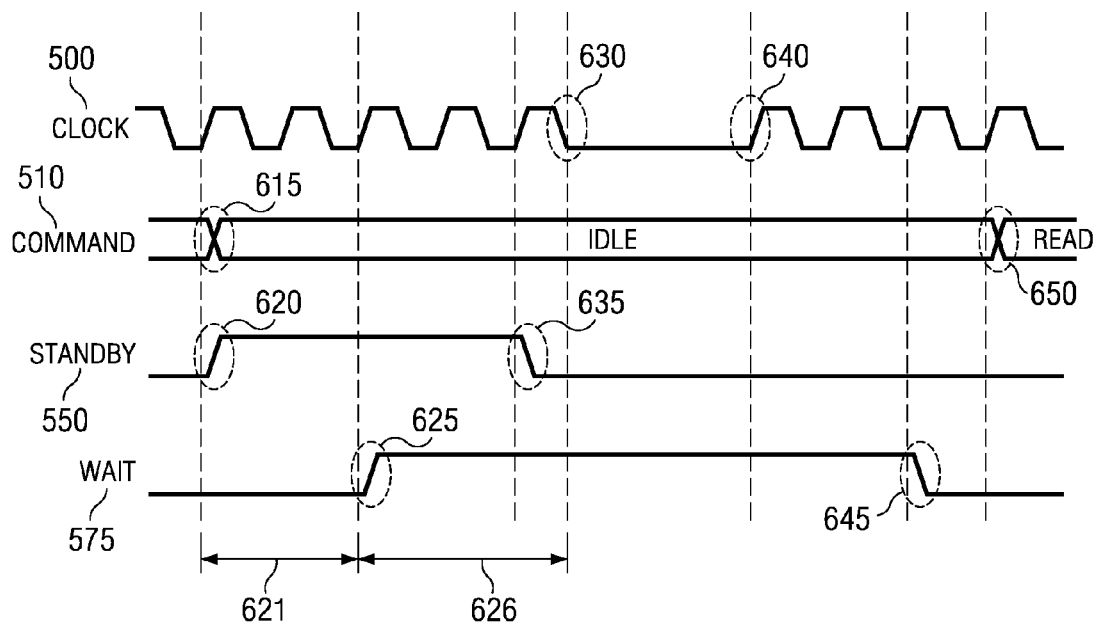
FIG. 5 shows a timing diagram of some signals associated with the initiator module for activating and deactivating the clock signal during standby mode.

Referring to FIG. 5, a timing diagram for initiator module 120 comprises a clock signal 500 to initiator module 120, command signal 510, standby signal 550, and wait signal 575 as described above. When command signal 510 becomes idle 615 and other requirements for entry into standby mode are present, initiator module 120 may activate 620 standby signal 550 to PCCM 100. After an amount of time 621, PCCM 100 activates wait signal 625, thus allowing initiator module 120 to enter standby mode. After another amount of time 626, PCCM 100 may turn off 630 clock signal 500 to the initiator module.

PCCM 100 may reduce or remove power to initiator module 120 (not shown in FIG. 5). Both time periods 621 and 626 described above may depend on initiator module 120 function and use. In some embodiments of the invention, initiator modules that are used frequently may be designed with longer delay times. In some embodiments of the invention, initiator modules 120 may have a longer settling time for power and clock 500 removal. Thus, a complex initiator module may have a longer settling time for removal of power compared to a simple initiator module 120. Further, PCCM 100 may reduce (not shown in FIG. 5) rather than eliminate clock signal 500 frequency in some embodiments of the invention. Time periods 621 and 626 may also depend on the capabilities of PCCM 100, interconnect module 130, and target module 140.

When initiator module 120 experiences a wakeup condition in standby mode, standby signal 550 may deactivate 635 synchronously to clock 500. When PCCM 100 detects that standby signal 550 has been deactivated, PCCM 100 may restore power to inactive portions of initiator module 120 and activate clock signal 500. PCCM 100 then deactivates wait signal 640 once interconnect module 130 and target module 140 are operating in steady state conditions. When PCCM 100 deactivates 645 wait signal 575, initiator module 120 may communicate with other modules in the device and return to normal functionality 650.

In some embodiments of the invention, wait signal 575 may be activated asynchronously from clock signal 500 and standby signal 550 may be deactivated asynchronously from clock signal 500. Thus, for example, wait signal 575 may be activated and standby signal 550 may be deactivated between deactivation 630 and activation 640 of clock signal 500.

Figure 6:
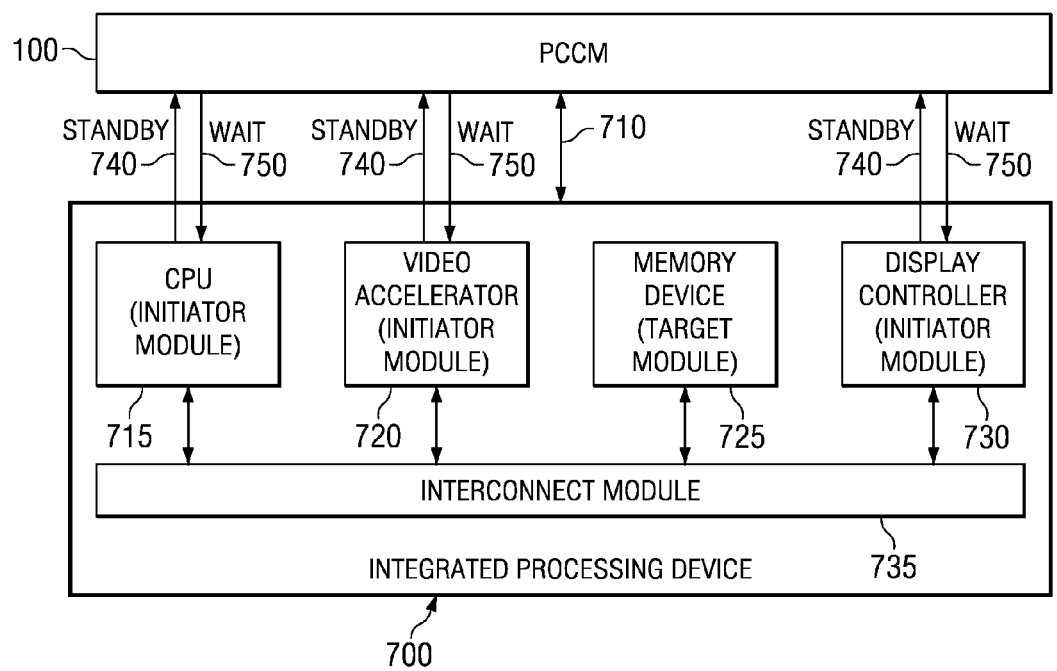
FIG. 6, in accordance with some embodiments of the invention, shows an integrated processing device with modules that may be placed in standby mode.

Turning now to FIG. 6, an integrated processing device (IPD) 700 consists of an interconnect module 735 coupled to a central processing unit (CPU) 715, video accelerator 720, memory device 725, and display controller 730. As described above, CPU 715, video accelerator 720, and display controller 730 may be initiator modules. Memory device 725 may be a target module. IPD 700 may provide display capability in a portable electronic device such as a cellular telephone, PDA, laptop computer, portable music player, or portable video game console. PCCM 100 couples to IPD 700 through a bus 710 and may provide power and clock signals (not shown) to each component 715, 720, 725, 730, and 735 separately. Further, PCCM 100 couples to CPU 715, video accelerator 720, and display controller 730 through separate standby and wait lines. For instance, PCCM 100 couples to CPU 715 through a power line and clock line (not shown in FIG. 6) and standby line 740 and wait line 750.

In accordance with some embodiments of the invention, components comprising IPD 700 may use the standby mode described above. Video accelerator 720, for instance, may be an initiator module 120 and may send read requests to memory device 725 that is a target module 140. When video accelerator 720 satisfies conditions for entry into standby mode, video accelerator may activate the standby signal to PCCM 100. PCCM 100 may activate the wait signal and video accelerator 720 may enter standby mode. If video accelerator 720 receives an interrupt from display controller 730, which may be a wakeup event from standby mode, the standby signal from video accelerator 720 may deactivate. PCCM 100 may then restore power and the clock signal to video accelerator 720 and deactivate the wait signal 200 so that video accelerator 720 may return to normal operating mode.

In some embodiments of the invention, components of IPD 700 may be initiator modules 120 and target modules 140 at different times. In some embodiments, video accelerator 720 may initiate write requests to display controller 730, thus making video accelerator 720 an initiator module. In some other embodiments, CPU 715 may initiate requests to video accelerator 720, thus making video accelerator 720 a target module. Also, in some embodiments, interconnect module 715 may comprise multiple interconnect modules (not shown in FIG. 6) capable of routing information from the initiator modules to the target modules. If one dedicated interconnect module couples video accelerator 720 to display controller 730 directly and both components enter standby mode, PCCM 100 may, in some embodiments of IPD 700, eliminate power and the clock signal to video accelerator 720, display controller 730, and the dedicated interconnect module. If video accelerator 720 wakes up from standby mode, PCCM 100 may provide power and the clock signal to the separate interconnect module so that video accelerator 720 may communicate with the target modules in the device.

In some embodiments of the device shown in FIG. 6, standby mode may not be present in all components of the electronic device. If IPD 700, for example, was part of a portable gaming device, display controller 730 may not contain the standby mode because the display device using display controller 730 may be active as long as the portable gaming device is active. However, video accelerator 720 may be capable of entering standby mode in the portable gaming device. Thus, when the portable gaming device does not need video acceleration, video accelerator 720 may enter standby mode.

As shown in FIG. 6, a device with multiple initiator modules and target modules may be capable of entering standby mode. Standby mode may enable portable electronic devices comprising multiple initiator and target modules to reduce power consumption while allowing normal operation. Furthermore, the operation of standby mode as described above may be tested and verified at a module level instead of at the device level, thus reducing the time and complexity to test the electronic device. In some embodiments of the invention, PCCM 100 may transmit multiple clock signals to an individual module. For example, the PCCM 100 may transmit two clock signals through two clock lines to the CPU.

In some embodiments of the invention, an initiator module may also contain a forced standby mode. Forced standby mode may be used as an alternative for standby mode. If standby mode in initiator module 120 of the system shown in FIG. 1 is not functioning properly, initiator module 120 may be placed into forced standby mode instead of standby mode. In forced standby mode, initiator module 120 may enter a power saving state only when initiator module 120 is completely inactive. When processing in initiator module 120 is not enabled, initiator module 120 activates the standby signal and enters forced standby mode. The PCCM 100 may remove initiator module 120 from forced standby mode. Forced standby mode may allow power management in initiator module 120, interconnect module 130, and target module 140 in the event that standby mode is not functioning properly during testing.

In some electronic devices, an initiator module may also contain a no-standby mode. In no-standby mode, the initiator module is prohibited from entering standby mode. Thus, if an initiator module is in no-standby mode, the initiator module may not activate the standby command. In some embodiments of the invention, each initiator module in the electronic device may contain a control register. Each control register may include a code indicating the type of standby mode (standby mode, forced standby mode, or no-standby mode) for the initiator module. For example, the control register in the electronic device may be programmed so that the initiator module operates in standby mode. Alternatively, the control register may be programmed so that the initiator module operates in forced standby mode. Thus, the initiator module may be capable of operating in different standby modes, and the control register may designate the particular standby mode for the initiator module. In some embodiments of the invention, a processor or other module coupled to the initiator module 120 may change the standby mode of initiator module 120 by modifying the contents of the control register.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus, comprising:
 a control module with a power output, a clock output, a wait output, and a standby input;
 an initiator module with a power input coupled to the power output of the control module, a clock input coupled to the clock output of the control module, a wait input coupled to the wait output of the control module, and a standby output coupled to the standby input of the control module, wherein the initiator module is configured to automatically detect an idle condition of the initiator module and to automatically transmit a standby signal to the control module in response to detecting the idle condition;

wherein the initiator module is configured to automatically enter a standby mode after transmitting the standby signal to the control module;

wherein the standby mode allows the initiator module to continue communicating with the control module while preventing the initiator module from initiating communication with other modules;

wherein the control module is configured to automatically transmit a wait signal to the initiator module in response to receiving the standby signal from the initiator module;

wherein the initiator module is configured to automatically deactivate the standby signal in response to detecting a wakeup event;

wherein the control module is configured to deactivate the wait signal in response to detecting that the standby signal has been deactivated;

wherein the initiator module is configured to transition from the standby mode to a normal mode in response to detecting that the wait signal has been deactivated; and wherein the normal mode allows the initiator module to initiate communication with the other modules.

2. The apparatus of claim 1, wherein the initiator module is a processor, graphics accelerator, display controller, audio interface, digital signal processor, microcontroller unit (MCU), direct memory access (DMA) device, video accelerator, or a universal serial bus (USB) device.

3. The apparatus of claim 1, wherein the control module is configured to automatically reduce power and at least one clock signal to the initiator module in response to receiving the standby signal from the initiator module.

4. The apparatus of claim 1, wherein the standby signal is activated and deactivated synchronously to at least one clock signal transmitted to the initiator module and the wait signal is activated and deactivated synchronously to the at least one clock signal transmitted to the initiator module.

5. The apparatus of claim 1, wherein the initiator module deactivates the standby signal asynchronously to at least one clock signal from the control module.

6. The apparatus of claim 1, wherein the initiator module is configurable to support a forced standby mode to be used if processing in the initiator module is not enabled and the standby signal is activated.

7. The apparatus of claim 1, wherein the initiator module is configurable to support a no standby mode to prevent activation of the standby signal.

8. The apparatus of claim 1, further comprising:
a target module with a power input coupled to the power output of the control module and a clock input coupled to the clock output of the control module; and
an interconnect module coupled between the initiator module and the target module, said interconnect module having a power input coupled to the power output of the control module and a clock input coupled to the clock output of the control module.

9. The apparatus of claim 8, wherein the interconnect module is capable of transmitting information between the initiator module and the target module.

10. The apparatus of claim 8, wherein the initiator module is capable of generating read and write requests to the target module.

11. The apparatus of claim 8, wherein the control module is configured to reduce power and at least one clock signal to the initiator module, the interconnect module, and the target module when the initiator module is in standby mode.

12. The apparatus of claim 11, wherein the control module is configured to deactivate the wait signal after the power and the at least one clock signal to the initiator module, the interconnect module, and the target module have been returned to normal operating levels.

13. A method for managing power in an electronic device, the method comprising:
automatically detecting, at an initiator module in an electronic device, an idle condition of the initiator module;
in response to detecting the idle condition, (a) automatically transitioning the initiator module from a normal state to a state of reduced communications and (b) automatically activating a standby signal of the initiator module;
detecting the standby signal at a control module in the electronic device;
in response to detecting the standby signal at the control module, automatically activating a wait signal of the control module;
detecting the wait signal at the initiator module;
after detecting the wait signal at the initiator module, detecting a wakeup event at the initiator module;
in response to detecting the wakeup event at the initiator module, deactivating the standby signal of the initiator module;
detecting, at the control module, that the standby signal has been deactivated;
in response to detecting at the control module that the standby signal has been deactivated, deactivating the wait signal of the control module;
detecting, at the initiator module, that the wait signal has been deactivated; and
in response to detecting at the initiator module that the wait signal has been deactivated, automatically transitioning the initiator module from the state of reduced communications to the normal state;
wherein the initiator module is allowed to communicate with the control module and with modules other than the control module when the initiator module is in the normal state; and
wherein the initiator module is not allowed to communicate with modules other than the control module when the initiator module is in the state of reduced communications.

14. A method according to claim 13, further comprising:
detecting the wakeup event at the initiator module before detecting the wait signal at the initiator module; and
in response to detecting the wakeup event at the initiator module before detecting the wait signal at the initiator module, automatically waiting for a predetermined period and then automatically transitioning the initiator module from the state of reduced communications to the normal state.

15. A method according to claim 14, wherein the predetermined period for delay comprises at least one clock cycle.

16. A method according to claim 13, wherein the operation of detecting the wakeup event at the initiator module comprises detecting at least one of the following:
an interrupt signal; and
a need to communicate with a module other than the control module.

17. A method according to claim 16, wherein the interrupt signal comprises a direct memory access (DMA) request.

18. A method according to claim 13, further comprising:
in response to detecting the standby signal at the control module, automatically reducing power supplied to the initiator module.

19. A method according to claim 13, further comprising:
in response to detecting the standby signal at the control module, automatically reducing a clock signal supplied to the initiator module.

20. A method according to claim 13, further comprising:
in response to detecting the standby signal at the control module, automatically deactivating a clock signal supplied to the initiator module.

21. A method according to claim 13, wherein:
the electronic device comprises a target module that is readable by the initiator module in the normal state; and
the method further comprises:
in response to detecting the standby signal at the control module, automatically reducing power consumed by the target module.

22. A method according to claim 21, further comprising:
in response to detecting the standby signal at the control module, automatically reducing power consumed by an interconnect module coupled between the initiator module and the target module.

23. An apparatus, comprising:
a control module;
an initiator module coupled to the control module, wherein the initiator module is configured to transmit a standby signal to the control module;
wherein the control module is configured to transmit a wait signal to the initiator module;
wherein the initiator module is configurable to enter a standby mode after the control module activates the wait signal to the initiator module; and
wherein the initiator module is configurable to enter a forced standby mode if processing in the initiator module is not enabled and the standby signal is activated.

* * * * *